United States Patent
Vu et al.

(10) Patent No.: US 9,219,540 B2
(45) Date of Patent: Dec. 22, 2015

(54) METHOD AND SYSTEM FOR PHASE COMPENSATION IN MULTI-PATH COMMUNICATION DEVICE

(75) Inventors: Mieu Van V. Vu, Austin, TX (US); John J. Vaglica, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 496 days.

(21) Appl. No.: 13/554,828

(22) Filed: Jul. 20, 2012

(65) Prior Publication Data

US 2014/0023048 A1    Jan. 23, 2014

(51) Int. Cl.
*H04B 7/26*    (2006.01)

(52) U.S. Cl.
CPC ........................ *H04B 7/26* (2013.01)

(58) Field of Classification Search
CPC ........ H04W 88/08; H04W 56/00; H04B 7/26; H04B 7/0671; H04B 17/0012
See application file for complete search history.

(56) References Cited

U.S. PATENT DOCUMENTS

| | | | |
|---|---|---|---|
| 6,829,229 B1 | 12/2004 | Palermo et al. | |
| 7,729,727 B2 | 6/2010 | Jeck et al. | |
| 8,138,790 B1 * | 3/2012 | Doubler et al. | 326/41 |
| 2001/0003095 A1 * | 6/2001 | Benz et al. | 455/517 |
| 2003/0171139 A1 * | 9/2003 | Sarresh et al. | 455/562 |
| 2005/0215227 A1 | 9/2005 | Vu et al. | |
| 2008/0300003 A1 * | 12/2008 | Jeck et al. | 455/517 |
| 2010/0113003 A1 | 5/2010 | Vaglica et al. | |
| 2011/0026540 A1 * | 2/2011 | Clem et al. | 370/422 |
| 2011/0096707 A1 | 4/2011 | McCoy et al. | |
| 2012/0093170 A1 * | 4/2012 | Cantu et al. | 370/415 |
| 2013/0336656 A1 * | 12/2013 | Belansky et al. | 398/79 |

* cited by examiner

*Primary Examiner* — Ian N Moore
*Assistant Examiner* — Eric H Wang
(74) *Attorney, Agent, or Firm* — Terrile, Cannatti, Chambers & Holland, LLP; Michael Rocco Cannatti

(57) ABSTRACT

A method and apparatus for a radio base station (300) aligns IQ data blocks for transmission over multiple radio frequency (RF) signal paths (318, 328, 338) between a base station controller (304) and a plurality of antennas (340) at the base station by determining a path delay (317, 327, 337) for each RF signal path, and then transmitting IQ data blocks from JESD 204 transmit interfaces (301-303) over each RF signal path ahead of a first predetermined time slot by an advance time period equaling the path delay for each RF signal path, thereby aligning IQ data block signaling to the first predetermined time slot at the antennas.

18 Claims, 7 Drawing Sheets

METHOD AND SYSTEM FOR PHASE COMPENSATION IN MULTI-PATH COMMUNICATION DEVICE

BACKGROUND OF THE INVENTION

1. Field of the Invention

The present invention is directed in general to field of information processing. In one aspect, the present invention relates to a wireless telecommunications system, apparatus, and method for aligning signal paths.

2. Description of the Related Art

Wireless communication systems increasingly use multiple RF transmission paths to transmit and receive over multiple antennas to achieve diversity benefits such as increased signal throughput, reliability and/or quality. For example, a multi-antenna base station may have different signal path delays for the transmit or receive signal paths between the radio base station and the radio equipment antennas. In such cases, the different signal path delays can present challenges in meeting timing alignment requirements between radio transmitter branches such as imposed by 3GPP technical specifications which limit the deviation between transmission paths, such as 3GPP TS 36.104, v9.5.0, paragraph 6.5.3. Phase delay management can be especially challenging with large cellular base stations involving many antennas and carriers where the base station controller maybe connected to antennas through variety of RF systems which usually have different hardware latencies due to different hardware implementation and link delay.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
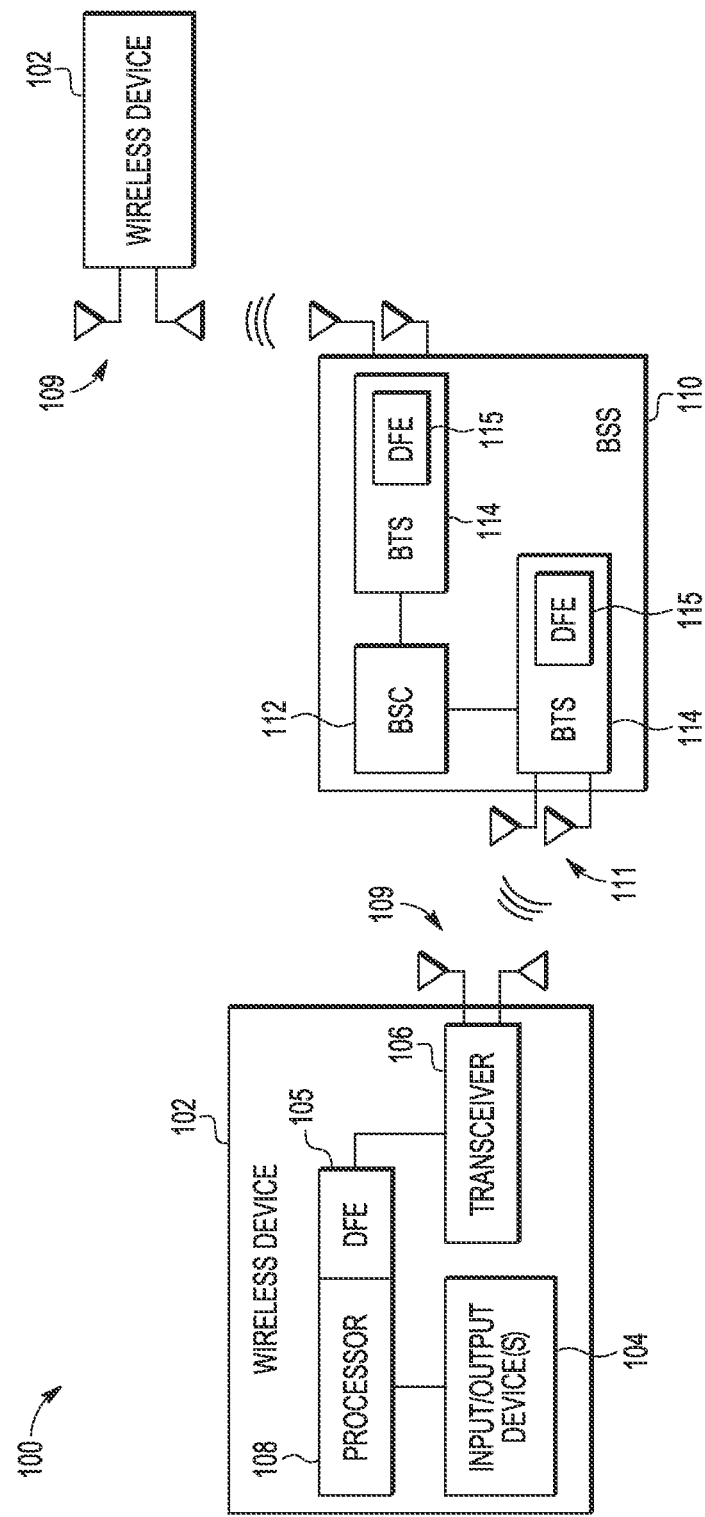
FIG. 1 is a simplified block diagram of a wireless communication system in which digital front end aligns transmit and/or receive signal paths in accordance with selected embodiments of the present disclosure.

A system, apparatus, and methodology are described for aligning the transmission and/or reception of signal data blocks across multiple signal paths in a multi-antenna wireless communication system. In selected embodiments, a single chip digital front end processor at a base station controller provides advance timing alignment of user data sent over different radio equipment antenna paths so that all user data blocks arrive at their corresponding antennas together at a specified timeslot (e.g., at the next radio frame boundary). Phase alignment may be achieved by measuring or otherwise obtaining the inherent delays between the digital front end and the antennas along each transmit/receive signal path. The measured delays may be provided to a phase control unit which programs phase alignment timers for each transmit/receive signal path to effectively cancel the different delays in the transmit/receive signal paths. In this way, the transmission of data for each transmit path is started in advance of the specified time on the next radio frame so that its user data arrives at the antenna at the specified time on the next radio frame. For example, and Q data samples for transmission to each antenna may be stored in a corresponding antenna-carrier (A×C) container and sent to the FIFO buffer in the corresponding JESD transceiver interface for transmission to the associated antenna under control of the separately programmed transmit buffer timers and transmit phase alignment timers. Similarly for received data, the retrieval of user data along each receive path from the receive interface may be delayed by a corresponding pre-determined delay period programmed into the receive phase alignment timer to compensate for line delay. To minimize alignment uncertainty across the transmit/receive paths between the modem and antennas, all clocks for the phase alignment timers are synchronous to a master clock.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

In this disclosure, Applicants have provided an improved wireless telecommunications system, apparatus, and method for managing phase delay across multiple signal paths that address various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

Turning now to FIG. 1, there is shown a simplified block diagram of a wireless communication system 100 having digital front end (DFE) modules at one or more multi-antenna system nodes for aligning transmit and/or receive signal paths. The depicted wireless communication system 100 includes a plurality of wireless devices or subscriber stations 102 (e.g., hand-held computers, personal digital assistants (PDAs), cellular telephones, etc.) that wirelessly communicate with one or more base station systems (BSS) 110 enhanced Node-B or eNB devices). Each wireless devices 102 may include a processor 108 (e.g., a digital signal processor), a transceiver 106 connected to one or more antennas, and one or more input/output devices 104 (e.g., a camera, a keypad, display, etc.), along with other components (not shown). The wireless devices 102 communicate with a base station controller (BSC) 112 of the base station subsystem 110 via one or more base transceiver stations (BTS) 114 to receive or transmit voice, data, or both voice and data. The BSC 112 may, for example, be configured to schedule communications for the wireless devices 102.

In the embodiments shown, the base transceiver station(s) 114 include a digital front end (DFE) processor 115 which may be implemented as a single integrated circuit to provide the digital components of the cellular basestation RF subsystem. The digital components consolidated on the DFE 115 may include one or more control processors and digital transmit/receive filters, as well as interface peripherals and other I/O for RF subsystem functions. In addition and as described more fully below, the DFE 115 may include a signal path alignment circuit which controls timing alignment of the data in and out of the DFE 115 over different transmit/receive signal paths to the base station antennas by performing phase compensation across multiple communication links with respect to a radio frame boundary.

As will be appreciated, the multi-path alignment techniques disclosed herein with reference to the base station system 110 may also be used in connection with a multi-antenna wireless communication device, such as the wireless devices 102. To this end, each wireless device 102 may also include a digital front end (DFE) processor 105 connected to a corresponding transceiver unit 106 which includes signal path alignment circuitry for performing phase compensation across multiple communication links with respect to a radio frame boundary.

Figure 2:
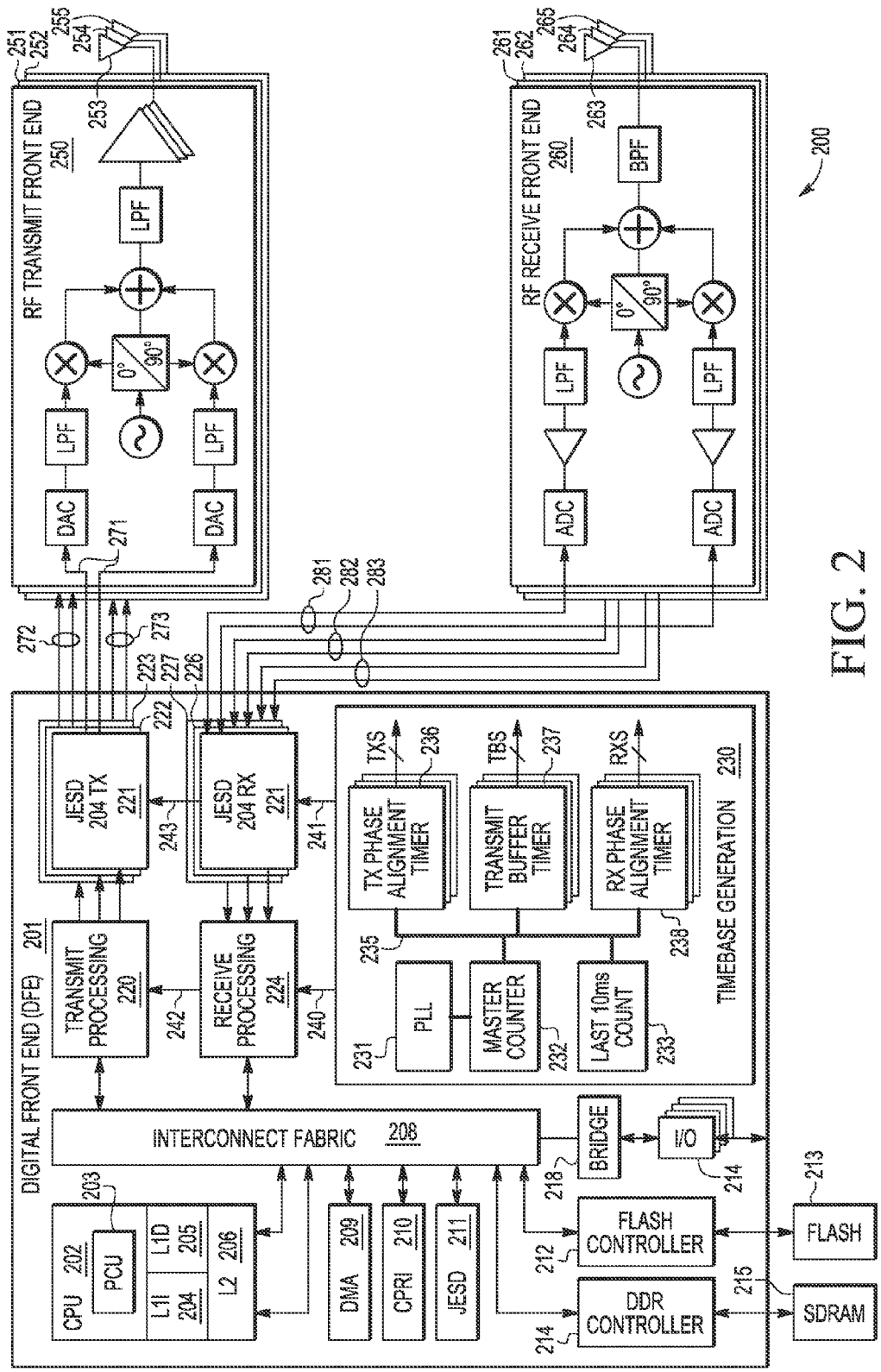
FIG. 2 is a block diagram illustration of a multi-antenna radio frequency (RF) subsystem in which a single chip digital front end (DFE) processor with a timebase generator is connected to RF transmit and receive front end circuits in accordance with selected embodiments of the present invention.

To further illustrate the signal path alignment techniques disclosed herein, reference is now made to FIG. 2 which is a high level architecture block diagram illustration of a multi-antenna radio frequency (RF) base station subsystem 200. The RF base station subsystem 200 is connected between abuse station controller (not shown) and transmit antennas 253-255 and/or receive antennas 263-265, and includes a single chip digital front end (DFE) processor 201 connected to a plurality of RF transmit front end circuits 250-252 and/or RF receive front end circuits 260-262. As will be appreciated, a radio receiver front end may be understood to refer to all circuitry between the antenna and the first intermediate frequency (IF) stage, including analog and digital receiver components that process the signal at the original incoming radio frequency (RF) before it is converted to a lower intermediate frequency (IF). As will be appreciated, the digital front end (DFE) processor 201 may be located in a radio head that is co-located with the base station controller, or may be located at a remote radio head that is not co-located with the base station controller. For simplicity of illustration, the transmit antennas 253-255 and receive antennas 263-265 are shown as being separate from one another, but it will be appreciated that a shared plurality of antennas may be used for both signal transmission and reception in a shared or switched circuit arrangement.

Connected to each transmit antenna (e.g., 253) is an RF transmit front end circuit (e.g., 250) which includes RF conversion circuit components (e.g., digital-to-analog converters, low pass filters, oscillators, splitters, mixers, amplifiers, etc.) for converting and filtering the digital I and Q samples 271 output by the DFE processor 201 to a combined analog signal that is filtered and amplified for transmission by a corresponding antenna (e.g., 253). In similar fashion, each receive antenna (e.g., 263) is connected to an RF receive front end circuit (e.g., 260) which includes RF conversion circuit components (e.g., bandpass filters, splitters, low pass filters, oscillators, mixers, amplifiers, analog-to digital converters, etc.) that process the signal from the corresponding antenna (e.g., 263) received at the original incoming radio frequency (RE) and convert it for processing by the DFE processor 201. Though the RF front end circuits (e.g., 250, 260) employ the depicted RF conversion circuit components, it will be appreciated that other RF conversion circuit arrangements and components can be used.

The depicted digital front end (DFE) processor 201 is provided to perform digital signal processing for the RF base station subsystem 200 across the separate transmit antennas 253-255 and/or receive antennas 263-265. To this end, the DFE processor 201 partitions transmit and receive signals to and from the antennas into transmit processing paths and receive processing paths, and communicates with the baseband modem through the Common Public Radio Interface (CPRI) interface 210 and/or JESD204A/B interface 211. The DFE processor 201 may include one or more control processors 202 (e.g., one or more ARM processor cores), memory subsystems (e.g., L1 instruction cache 204, L1 data cache 205, L2 cache 206), memory controllers (e.g., DMA controller 209, flash controller 212, and DDR controller 214) for interfacing with external memory (e.g., Flash memory 213, SDRAM 215), one or more modem interfaces (e.g., CPRI interface 210 and JESD204A/B interface 211), and 110 facilities (e.g., host bridge 218) for I/O devices 219. As a general matter, any of a variety of memory designs and hierarchies may be employed in, or in conjunction with, with the DFE processor 201. Also, it will be appreciated that the I/O devices 219 may include any desired I/O device, such as Ethernet, I2C, SPI, GPIO, and/or UART devices. All processor subsystems are linked by a multi-level interconnect fabric 208.

To digitally process transmit signals, the DFE processor 201 may also include a programmable transmit signal processing path for each transmit antenna 253-255 which is formed with a transmit signal processor 220 and an associated serialized interface 221-223 (e.g., a JESD204B TX interface) and RF transmit front end 250-252. The transmit signal processor 220 may include one or more processors vector processors) and associated memory (e.g., RAM) for performing carrier-related signal processing and antenna-specific processing on IQ samples received from the baseband modem. Once signal processing is completed, the transmit signal processor 220 may send the processed samples to an associated serialized interface (e.g., JESD204B TX 221) for transfer to the transceiver (e.g., 250) over IQ signal lines 271. In this way, a first antenna path is formed by the connection of the transmit signal processor 220 and JESD204B TX interface 221 which are connected over IQ signal lines 271 to transceiver 250 and antenna 253, a second antenna path is formed by the connection of the transmit signal processor 220 and JESD204B TX interface 222 which are connected over IQ signal lines 272 to transceiver 251 and antenna 254, and a third antenna path is formed by the connection of the transmit signal processor 220 and JESD204B TX interface 223 which are connected over IQ signal lines 273 to transceiver 252 and antenna 255.

In similar fashion, received signals may be digitally processed at the DFE processor 201 with a programmable receive signal processing path for each receive antenna 263-265. Each receive signal path is formed with a receive signal processor 224 and an associated serialized interface 225-227 and RF receive front end 260-262 that is connected to a receive antenna 263-265. The receive signal processor 220 may include one or more processors vector processors) and associated memory (e.g., RAM) for performing receive signal processing on IQ samples received from the transceiver front end 260-262 over one of the JESD receive interfaces 225-227. Once signal processing is completed, the receive signal processor 224 may send the processed samples to the baseband modem, such as by using the CPRI interface module 210. In this way, a first antenna path is formed by the connection of the antenna 263 and transceiver 260 which are connected over IQ signal lines 281 to the JESD204B RX interface 225 and receive signal processor 224, a second antenna path is formed by the antenna 264 and transceiver 261 which are connected over IQ signal lines 282 to the JESD204B RX interface 226 and receive signal processor 224, and a third antenna path is formed by the antenna 265 and transceiver 262 which are connected over IQ signal lines 283 to the SESD204B RX interface 227 and receive signal processor 224.

With multiple transmit and/or receive signal paths between the DFE processor 201 and antennas 253-255, 263-265, there can be different signal path latencies on each signal path due to different hardware implementations and link delays for each path. For example, different inherent signal path delays can arise along each signal path due to digital filtering, A/D or D/A converters, analog components, coaxial length, and other wire delays. This can create problems when transmitting different signal data blocks over separate transmit signal paths if the signal data blocks arrive at the transmit antennas at different times due to different inherent delays in each transmit signal path. Similar problems arise when processing signal data blocks that are received over receive signal paths having different inherent signal path delays. For example, the different transmit signal path delays can prevent base stations from meeting 3GPP technical specifications for limiting the deviation between transmission paths. The ability to compensate for different transmit signal path delays is constrained, not only by the requirement that different JESD interfaces to different antennas be synchronized using the same reference signal, but also by the resolution of JESD interface synchronization which is limited to frame or multiframe boundaries, and therefore does not meet 3GPP requirements. In addition, software-based synchronization solutions are constrained by variable latency that is inherent to software-based signal processing and that impairs the ability to achieve fixed delay timing in the signal path. On the other hand, hardware-based signal processing can achieve fixed delay timing in the signal paths, but at the expense of increased circuit complexity, limited flexibility, and higher manufacturing costs.

To compensate for differences in the inherent signal path delays, a timebase generator 230 is included in the DFE processor 201 to provide timing alignment of the data in and out of the DFE processor 201 by generating timed output strobe and timestamping signals 240-243 of time critical inputs for purposes of controlling the JESD interfaces 221-223, 225-227. In selected base station embodiments employing JESD204-type serialized interfaces, the timebase generator 230 provides mechanism to transmit the IQ samples ahead of the RF sync pulse, and to retrieve IQ samples from the receive interface after a pre-determined delay period relative to a reference or sync pulse, to compensate for line delay. In addition, deterministic or fixed latency is achieved by tying the JESD interface timing back to the CPRI synchronization pulse and pre-loading software-generated data into a transmit buffer ahead of time so that the data is prepared for loading (e.g., by DMA operation) when requested.

The timebase generator 230 includes a master counter 232, such as a 64-bit free-running master counter which is clocked by an on-chip digital phase lock loop (PLL) 231. In addition, a previous count capture register 233 is connected over the connection bus 235 to the master counter 232 for purposes of capturing and storing the value of the master counter at a predetermined previous event. In an example implementation, the previous count capture register 233 is a Last 10 ms Counter register which stores the value of the master counter 232 at the last 10 ms frame boundary. This capture register 233 is updated at every frame boundary and will be used by software to determine the total delay offset required for aligning data blocks along different signal paths.

The timebase generator 230 also includes a plurality of transmit phase alignment timers 236 (e.g., one per transmit path) coupled to the connection bus 235, each of which may be configured or programmed to align transmit data blocks by generating an transmit strobe pulse TXS for controlling the transmission of outgoing IQ samples ahead of a predetermined reference event, such as an RF sync pulse. In addition, the timebase generator 230 may include a plurality of transmit buffer timers 237 (e.g., one transmit buffer timer per path) coupled to the connection bus 235, each of which may be configured or programmed to enable data transfer from the transmit signal processor 220 to a serialized interface (e.g., JESD204B 221) by generating a transmit buffer pulse TBS ahead of a predetermined reference event, such as the transmit strobe pulse, to guarantee that data will be available before the event is asserted. For received signals, the timebase generator 230 may include a plurality of receive phase alignment timers 238 (e.g., one per receive path) coupled to the connection bus 235, each of which may be configured or programmed to align receive data blocks by generating a receive strobe pulse RXS for controlling the retrieval of incoming IQ samples after a predetermined delay period relative to a predetermined reference event, such as an RF sync pulse. In order to control the timing and operation of the phase alignment timers 236, 238 and/or transmit buffer timer 237, the processor(s) 202 implement a phase control unit (PCU) 203 with a programmed functionality that is configured to measure or retrieve inherent delays along the transmit/receive signal paths to the antennas, and then use the signal path delay values to program the alignment and/or buffer timers 236-238 to effectively cancel the delay from the transmit/receive signal paths by starting data transmission from the serialized interface early and delaying retrieval of received data from the serialized interface.

Figure 3:
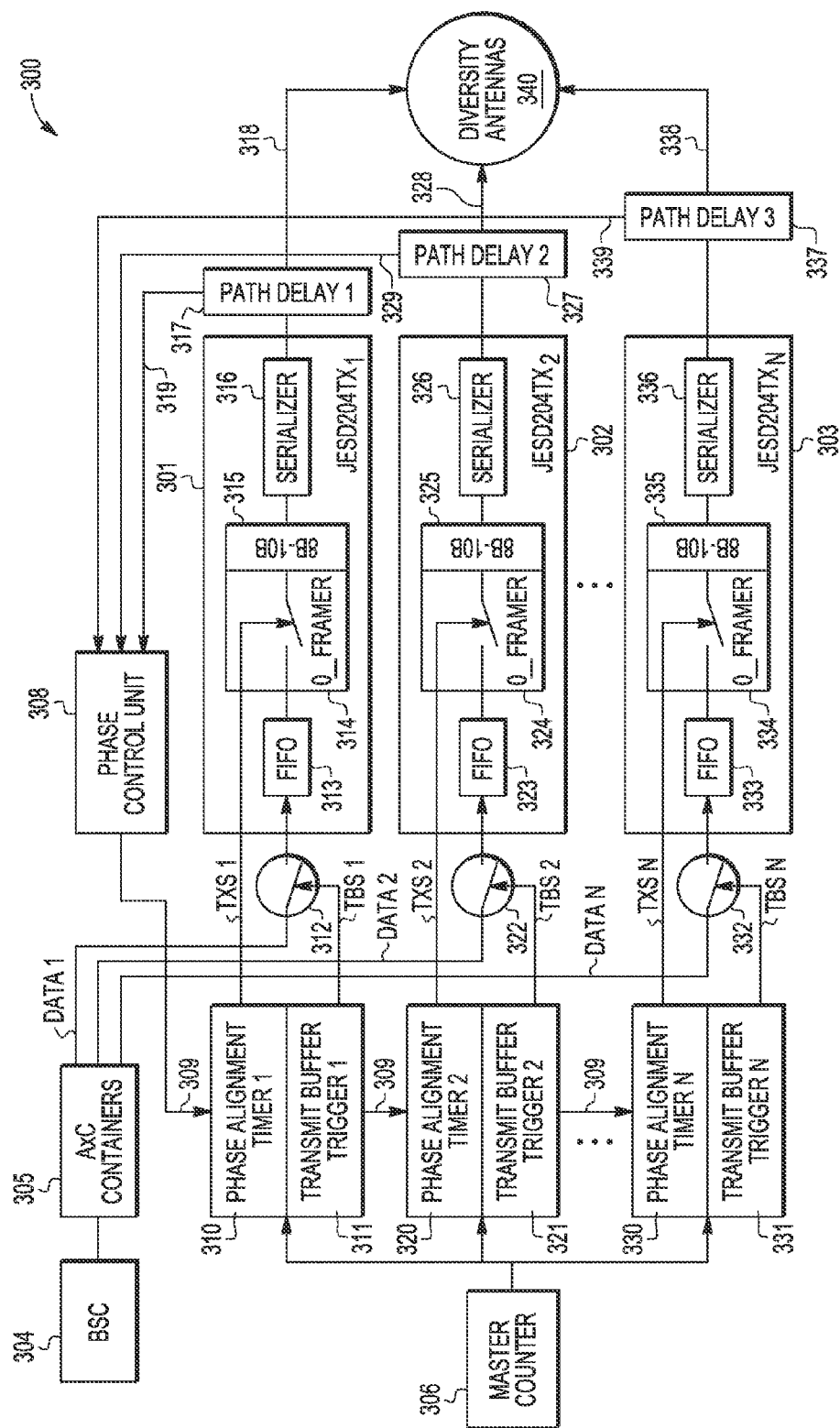
FIG. 3 is a block diagram of a base station DFE processor with a timebase generator for aligning data block transmission over multiple transmit signal paths.

To provide additional details of selected base station embodiments, reference is now made to FIG. 3 which depicts a block diagram 300 of a timebase generator 305, 310-311, 320-321, 330-331 for controlling a plurality of JESD204 interfaces 301-303 to align data block transmissions from a base station controller 304 over multiple transmit signal paths 318, 328, 338 to multiple antennas at the radio equipment 340, where each transmit signal path has an inherent transmission delay 317, 327, 337 which can arise due to different hardware implementations and link delays in each path. In operation, the base station controller 304 generates I and Q samples for a plurality of transmit signal paths which are to be transmitted via diversity antennas 340. The IQ data samples for each transmit signal path are stored in the antenna-carrier (AxC) containers 305, where each AxC container holds user data for a transmit signal path over an antenna. Delivery and timing alignment of IQ data samples Data 1, Data 2, Data 3 across multiple transmit signal paths 318, 328, 338 is controlled by a phase control unit 308 and signal path timers 310-311, 320-321, 330-331 which are programmed by the PCU 308 to align digital radio samples transmissions across corresponding serialized data interfaces 301-303 to multi-antenna radio equipment 340 and associated radio equipment (e.g., RF transmit front end circuitry).

In accordance with selected embodiments, phase alignment timers 310, 320, 330 are provided for each transmit signal path 318, 328, 338, where each phase alignment timer may be programmed to cancel any inherent delay in its corresponding signal transmit path. To this end, the inherent delays 317, 327, 337 between the digital front end processor and the multi-antenna equipment 340 must be measured, calibrated, or otherwise obtained by the PCU 308. As indicated with signaling lines 319, 329, 339, the inherent delay values 317, 327, 337 for each path may be determined using any desired technique, such as by performing calibration testing at the factory, using software-based testing in the field, retrieving stored delay values, or sending, receiving, and correlating a reference signal having a known reference time point.

Using the measured values of path delays 317, 327, 337, the phase control unit 308 programs the phase alignment timers 310, 320, 330 with one or more timer control values 309 to cancel the delay in all downlink signal paths 318, 328, 338. For example, the programmed control values 309 provided to a phase alignment timer 310 for a first transmit signal path 318 may be used to generate a first transmit strobe pulse TXS1 which starts the transmission of user data over the first transmit signal path 318 in advance by an amount corresponding to the inherent path delay 317 so that the user data arrives at the antenna at the specified time. In similar fashion, the programmed control values 309 provided to the phase alignment timers 320, 330 for the other transmit signal paths are used to generate transmit strobe pulses TXS2, TXSn which advance the transmission of user data over the corresponding transmit signal paths 328, 338 by an amount corresponding to the inherent path delay 327, 337.

It will be appreciated that the data interfaces 301-303 may be implemented with any desired serialized interface (such as a JESD204 digital interface, including a JESD204, JESD204A or JESD204B digital interface), but may also be implemented with a parallel interface, an interface for mobile devices, or other protocols with similar capabilities. In selected base station embodiments where transmit data is serialized using JESD204, JESD204A, or JESD204B interfaces, each interface JESD204TX1, JESD204TX2, JESD204TX may include a FIFO input buffer 313, 323, 333 connected in series with a switched framer sub-module 314, 324, 334, an 8b10b decoder 315, 325, 335, and a serializer sub-module 316, 326, 336. In each transmit signal path (e.g., 318), the FIFO input buffer (e.g., 313) receives IQ data from the AxC containers 305 (e.g., over the interconnect fabric 208) and stores the IQ data as a data packet. At the switched framer sub-module (e.g., 314), the received IQ data samples are processed by adding markers to frame each data packet. The 8-bit output from each switched framer sub-module (e.g., 314) may then be converted to 10-bit format with an 8b10b encoder (e.g., 315) prior to serialization at the serializer sub-module (e.g., 316).

In the depicted embodiments, IQ data samples from the AxC containers 305 may be stored in the FIFO buffer 313, 323, 333 using a direct memory access (DMA) controller (not shown) to effectively transfer IQ data samples from the AxC container 305 to the corresponding FIFO buffer 313, 323, 333 in response to transmit buffer strobe signals TBS 1, TBS 2, TBS n generated ahead of a predetermined reference event, such as the transmit strobe pulse, to guarantee that data will be available before the event is asserted. The functionality of this transfer is shown with transmit buffer switches 312, 322, 332 which are controlled with the transmit buffer strobe signals TBS 1-n generated by the transmit buffer timers 311, 321, 331. Each transmit buffer timer 311, 321, 331 is programmed by the PCU 308 to enable data transfer from the AxC containers 305 to guarantee that data is available for the JESD204 interface to avoid starvation.

In addition to controlling the delivery of IQ data samples to the FIFO input buffers 313, 323, 333, the PCU 308 can control the timing and alignment of IQ data sample transmission along each transmit signal path 318, 328, 338 by controlling the switched framer sub-modules 314, 324, 334 with transmit strobe pulses TXS1, TXS2, TXSn generated by the phase alignment timers 310, 320, 330. With this arrangement, the PCU 308 may generate programmed control values 309 to adjust or advance the timing of each serialized data interface 301-303 by an amount corresponding to its associated inherent path delay. Consider the example of IQ data samples stored in the FIFO buffer 313 which are to be transmitted over a first transmit signal path 318 at a first predetermined radio frame or RF sync pulse. In order to compensate for inherent delay 317 in the first transmit signal path 318, the phase alignment timer 310 is programmed to generate a first transmit strobe pulse TXS1 which effectively transmits the IQ samples ahead of the predetermined RF sync pulse. In an example embodiment, this may be accomplished by transmitting the IQ samples in the previous radio frame with a double-pole switch circuit in the switched framer (e.g., 314) so that sync data and a lane synchronization sequence (e.g., a string of 0s) are transmitted until the first transmit strobe pulse (e.g., TXS1) causes the stored IQ samples from the FIFO buffer (e.g., 313) to be transmitted during the previous radio frame. In embodiments where IQ data samples are advanced by inserting 0s into the previous radio frame, the insertion should occur before processing at the 8b10b decoder 315, 325, 335 in order to achieve signal entropy. In similar fashion, phase alignment timers 320, 330 for other transmit signal paths 328, 338 may separately adjust the transmission of IQ data samples to compensate for inherent path delay 327, 337 using transmit strobe pulses TXS2. TXSn to control the switched framer 324, 334 so that sync data and a lane synchronization sequence are transmitted until the corresponding transmit strobe pulses TXS2, TXSn causes the stored IQ samples from the FIFO buffer 323, 333 to be transmitted during the previous radio frame. By separately programming and controlling the advance transmission of the IQ sample data over the different transmit signal paths 318, 328, 338, each of the IQ data samples arrive at the diversity antennas at the specified time on the next radio frame.

Figure 4:
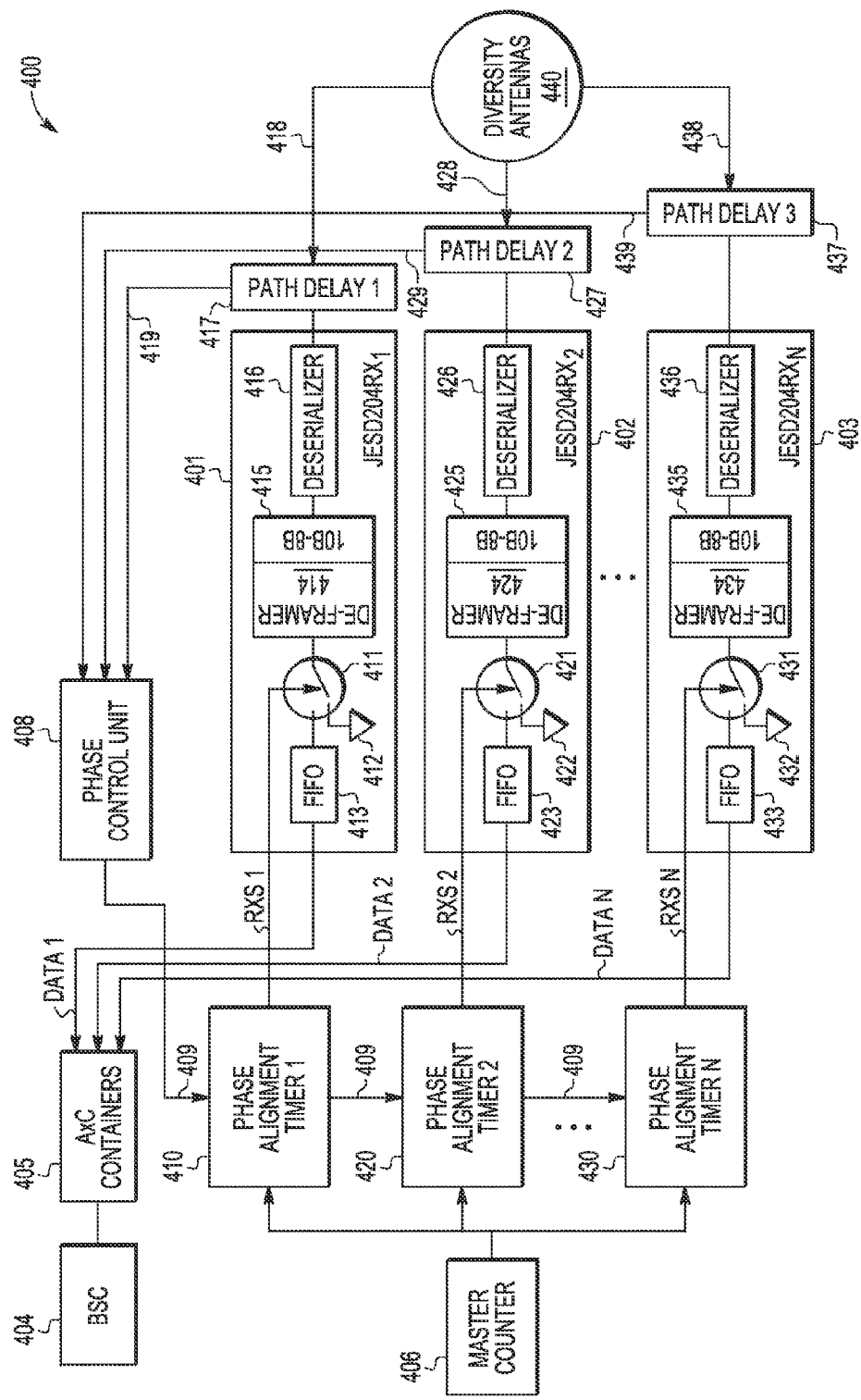
FIG. 4 is a block diagram of a base station DFE processor with a timebase generator for aligning data block reception over multiple receive signal paths.

To illustrate how received data blocks can be aligned in selected base station embodiments, reference is now made to FIG. 4 which depicts a block diagram 400 of a timebase generator 405, 410, 420, 430 for controlling a plurality of JESD204 interfaces 401-403 to align data blocks received over multiple receive signal paths 418, 428, 438 and digital interfaces 401, 402, 403 from diversity antennas and associated radio equipment 440, where each receive signal path has an inherent path delay 417, 427, 437. In order to align the IQ samples received over the receive signal paths 418, 428, 438 for storage in the antenna-carrier (AxC) containers 405 and processing by the base station controller 104, phase control unit 408 and signal path timers 110, 420, 430 are provided for each receive signal path 418, 428, 438, where each phase alignment timer may be programmed to cancel any inherent delay in its corresponding receive signal path.

As a preliminary step in cancelling path delay in the receive signal path, the inherent path delays 417, 427, 437 from the diversity antennas 440 must first be measured, calibrated, or otherwise obtained by the PCU 408. As indicated with signaling lines 419, 429, 439, the inherent delay values 417, 427, 437 for each path may be determined using any desired technique, such as by calibrating each signal path and storing the resulting path delays during factory testing, using software-based testing in the field, retrieving stored de values, or sending a reference signal having a known reference time point.

Using the measured values of the path delays 417, 427, 437, the phase control unit 408 programs the phase alignment timers 410, 420, 430 with one or more timer control values 409 to cancel the delay in all uplink signal paths 418, 428, 438 by delaying the retrieval of IQ samples. For example, the programmed control values 409 provided to a phase alignment timer 410 for a first receive signal path 418 may be used to generate a first receive strobe pulse RXS1 which delays the retrieval of user data from the first transmit signal path 418 by a predetermined delay period corresponding to the inherent path delay 417 so that the user data provided to the AxC container 405 is correctly retrieved by taking into account the path delay 417. In similar fashion, the programmed control values 409 provided to the phase alignment timers 420, 430 for the other receive signal paths are used to generate receive strobe pulses RXS2, RXSn which delay the retrieval of user data over the corresponding receive signal paths 428, 438 by an amount corresponding to the inherent path delay 427, 437.

In selected base station embodiments where the digital interfaces 401-403 used to process the received IQ data samples are implemented as JESD204, JESD204A, or JESD204B interfaces, each interface JESD204RX1, JESD204RX2, JESD204RXn may include a de-serializer sub-module 416, 426, 436 connected in series with an 10b8b decoder 415, 425, 135, de-framer sub-module 414, 424, 431, connection switch 411, 421, 431, and FIFO output buffer 113, 423, 433. In each receive signal path (e.g., 418), IQ samples received from the antenna 440 are deserialized and framed for storage in the FIFO output buffer to await storage in the AxC containers 405. However, the timing and alignment of IQ data sample reception along each receive signal path 418, 428, 438 may be controlled by the phase control unit 408 which programs the phase alignment timers 410, 420, 430 to generate receive strobe pulses RXS1, RXS2, RXSn which gate the connection switches 411, 421, 431. As will be appreciated, the switching functionality may also be implemented with a direct memory access (DMA) controller (not shown) to effectively transfer IQ data samples to the AxC container 405 in response to the receive strobe pulses RXS1, RXS2, RXSn. In particular, the PCU 408 may generate programmed control values 409 to adjust or delay the retrieval of data at each serialized data interface by an amount corresponding to its associated inherent path delay. Consider the example of IQ data samples received over a first receive signal path 418 at a first predetermined radio frame or RF sync pulse. In order to compensate for inherent delay 417 in the first transmit signal path 418, the phase alignment timer 410 is programmed to generate a first receive strobe pulse RXS1 which effectively delays the retrieval of IQ samples from the receive interface (JESD204RX1 401) until after a pre-determined delay period relative to the first predetermined RF sync pulse. In an example embodiment, this may be accomplished by ignoring or discarding IQ samples received in a specified radio frame until the pre-determined delay period has expired, such as by controlling a connection switch circuit (e.g., 411) with a receive strobe pulse (e.g., RXS1) so that received IQ samples are only provided to the FIFO output buffer (e.g., 413) in response to the receive strobe pulse, but are otherwise routed by the connection switch circuit (e.g., 411) to a discard node (e.g., 412). In similar fashion, phase alignment timers 420, 430 for other receive signal paths 428, 438 may separately adjust the retrieval of IQ data samples to compensate for inherent path delay 427, 437 using receive strobe pulses RXS2, RXSn to control the connection switches 421, 431 so that the receive interfaces JESD204RX2, JESD204RXn output the received IQ samples from the framer (424, 434) after the pre-determined delay period. By separately programming and controlling the delayed retrieval of the IQ sample data over the different receive signal paths 418, 428, 438 to compensate for line delay 417, 427, 437, each of the receive interfaces JESD204RX1, JESD204RX2, JESD204RXn retrieve and output only the IQ data samples that are intended for a given radio frame.

Figure 5:
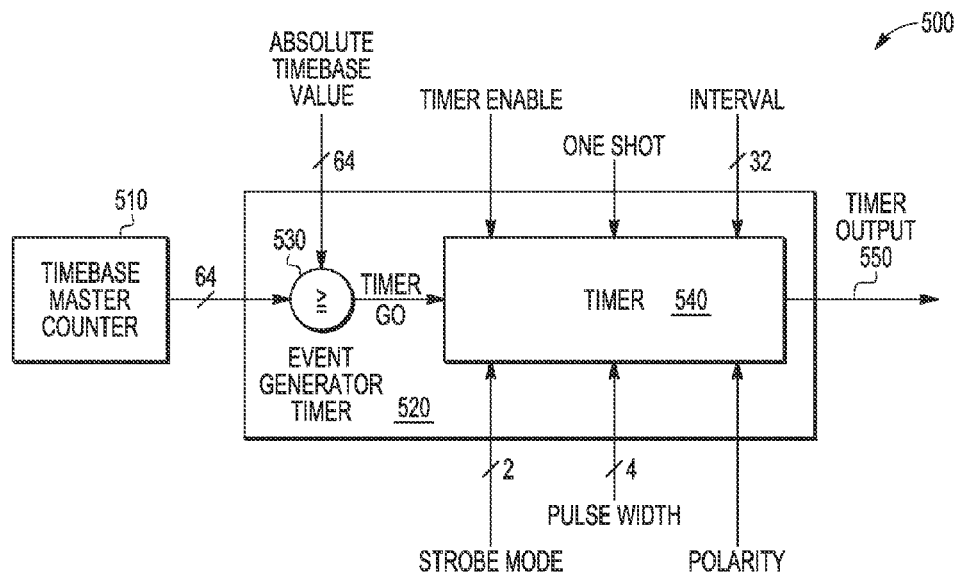
FIG. 5 shows an event timing generator unit for generating event timing signals that can be used for phase alignment and loading the FIFO buffer with transmit data.

As described hereinabove, one or more alignment timers, such as phase alignment timers (e.g., 310, 410) and/or transmit buffer triggers (e.g., 311), may be employed to align and/or load data blocks received or transmitted over separate signal paths by generating event timing signals, such as transmit or receive strobe pulse signals (e.g., TXS1, RXS1). In selected embodiments of a single chip digital front end (DFE) processor, a common timer structure may be employed for implementing the alignment timers. For example, FIG. 5 shows an example event timing generator 500 which may be used to generate event timer output signals 550 for aligning and/or loading IQ samples. The depicted event timing generator 500 includes a master counter 510 that is connected to an event generator timer 520. In the event generator timer 520, a comparator circuit 530 compares an input from the master counter 510 to a programmable Absolute Timebase Value. The output of the comparator circuit 530 is connected to a timer 540 having a plurality of control inputs and an event tinier output 550. The full set of programmable control inputs includes a timer enable input, a OneShot input, an Interval input, a StrobeMode input, a PulseWidth input, and a Polarity input. However, selected control inputs my be tied off, resulting in reduced functionality depending on the application of the event timing generator 500.

In operation, the event generator timer 520 generates an event or pulse at the event timer output signal 550 when the comparator 503 detects that the 64-bit master counter 510 generates a value that is greater than or equal to the absolute timebase offset value programmed for the event generator tinier 520. Depending on the value of the OneShot control input, the output pulse at the event timer output signal 550 can occur once (in the one-shot mode), or repeat in a periodic fashion. In one-shot mode, the timer 540 fires once and goes to sleep. In the repeating or periodic mode, the timer output event will fire repeatedly. The period of the repeated output events is configured by the Interval control input bits for the timer 540, where the interval value represents the number of reference clock cycles between output events. In addition, the timer output event 550 may be configured for varying strobe behavior using the StrobeMode control input. The strobe can be have a programmable pulse width in response to the Pulse-Width control input, or a simple toggle, or an approximate 50% duty cycle pulse. The polarity of the event timer output signal 550 can be configured using the Polarity control input bit.

Figure 6:
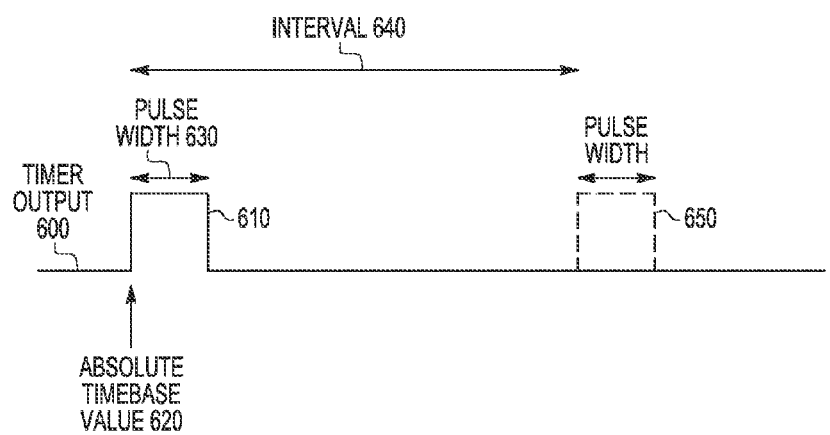
FIG. 6 shows an example event timing signal waveform.

To illustrate an example event timer output signal 550 generated by the event timing generator 500 shown in FIG. 5, reference is now made to FIG. 6 which shows an example event timing signal waveform 600 having one or more pulses 610, 650. A first pulse 610 is generated when the absolute timebase value 620 is met or exceeded by the master counter value. The pulse width 630 of the pulse 610 may be controlled by the PulseWidth control input, while the periodicity or interval value 640 between repeating pulses 610, 650 may be controlled by the Interval control input. Depending on the value of the OneShot input signal, a single pulse 610 will be generated or a plurality of periodic pulses 610, 650 will be generated.

As disclosed herein, the event timing generator 500 may be used to implement that transmit phase alignment timers to control the transmission of data samples in advance of or at the start of the targeted 10 ms radio frame, thereby providing transmit advance timing to compensate for any signal path link delay (i.e., due to delay in signal processing and transmission). In this application, the Interval, StrobeMode, and PulseWidth control inputs may be tied off if only a single pulse output of indeterminate pulsewidth is required from the transmit phase alignment timer. In addition or in the alternative, the event timing generator 500 may be used to implement that transmit buffer timers which control the data transfer from the transmit signal processor to the JESD204 TX interface, in which case the Interval StrobeMode, and PulseWidth control inputs may be tied off. Finally, the event timing generator 500 may be used to implement that receive phase alignment timers to control the reception of data samples by delaying sampling of the incoming data blocks to compensate for any signal path link delay. In this application, the control inputs may be used to generate single or repetitive strobe pulses of specified pulse widths and polarity. Each of the control inputs to the event timing generator may be programmed or controlled by the phase compensation unit (e.g., 308). Additional instances of timing generator 500 can be beneficial to the system for generation of timed interrupts to the processors (e.g., 202), and/or periodic strobes for synchronization of events in the RF subsystem such as receiver gain adjustments or transmitter power amplifier supply voltage changes.

Figure 7:
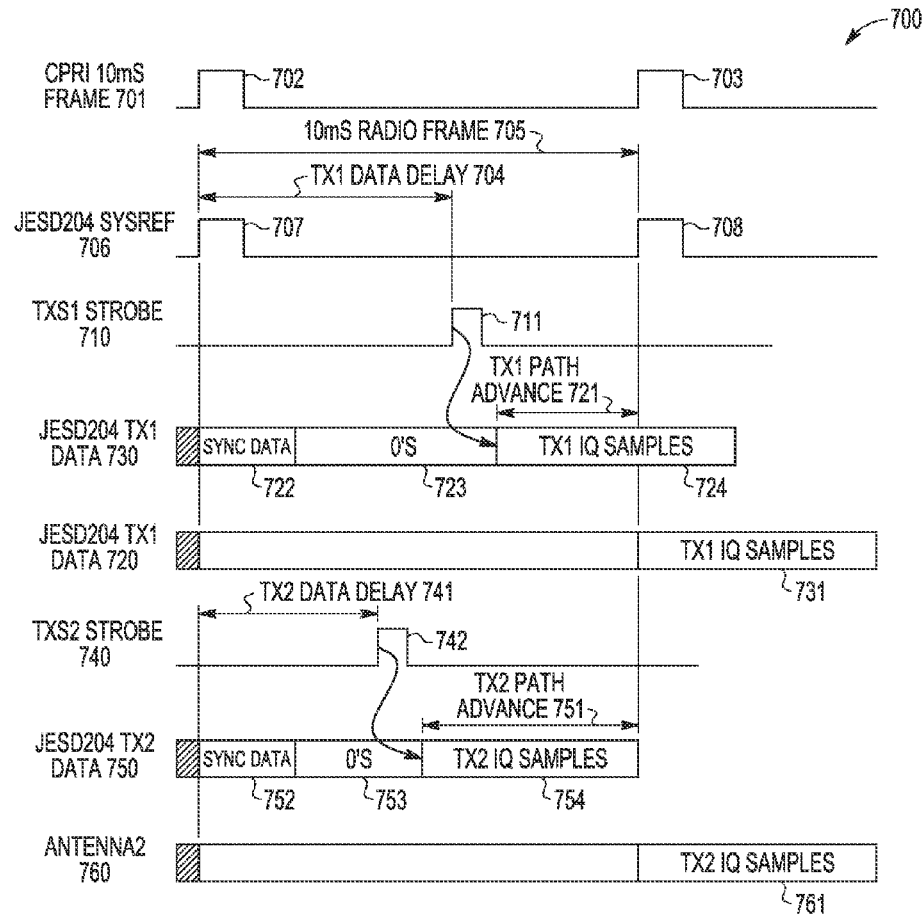
FIG. 7 is a timing diagram illustrating JESD phase alignment of data for a transmit signal path.

To provide an example illustration of how data blocks transmitted on different transmit signal paths can be aligned to compensate for individual transmit path delays, references is now made to FIG. 7 which depicts a timing diagram 700 illustrating JESD204 phase alignment of data for first and second transmit signal paths (TX1 and TX2). As disclosed herein, timing adjustments are made with reference to one or more synchronization reference signals having pulses periodically generated at predetermined intervals, such as a 10 mS radio frame interval 705. For example, the sync reference signal may be selected from a CPRI 10 mS frame signal 701 having periodic pulses 701, 703, a JESD204 system reference signal 706 having periodic pulses 707, 707, a locally generated 10 mS frame sync signal, or the like. In the example illustrated in FIG. 2, a radio frame generator not shown) may generate a 10 ms Radio Frame signal 701, 706 that is provided to the master counter 232 and previous count capture register 233.

In order to align IQ samples that are to be transmitted over a first transmit signal path TX1 with reference to a predetermined radio frame pulse (e.g., CPRI pulse 703 or JESD204 SYSREF pulse 708), the IQ samples for the first transmit signal path (TX1 IQ Samples) are advanced by an amount (TX1 Path Advance 721) that corresponds to the data path delay for the first transmit signal path TX1. To this end, a transmit data delay value 704 (TX1 Data Delay) for the first transmit signal path TX1 is computed and used to generate a first transmit strobe signal (TXS1 Strobe) 710 having a pulse 711 which is delayed from the previous radio frame pulse 702/707 by the TX1 Data Delay 704. In the example illustrated FIG. 2, a first transmit phase alignment timer 236 may generate a first transmit strobe signal (TXS1 Strobe) 710 having the pulse 711 that is provided over timer control line 243 to a first JESD204 transmit interface 221. In turn, the first JESD204 transmit interface 221 is configured to generate a data signal output 720 (JESD204 TX1 DATA) having a first sync data portion 722, a transmit alignment portion 723, and an IQ sample portion 724. Ordinarily, a JESD204 transmit interface would transmit the IQ samples immediately after transmitting a sync data portion at the reference radio frame pulse 703, but the IQ samples would be delayed in reaching the transmit antennas by the data path delay. To cancel this path delay, the transmit alignment portion 723 is inserted after the sync data portion 722 and transmission is advanced to the previous radio frame pulse 702/707, as shown with the JESD204 TX1 data signal output 720 (JESD204 TX1 DATA). As shown in FIG. 3, the transmit alignment portion 723 may be inserted by the switched framer (e.g., 314) as a sequence of 0s under control of the first transmit strobe signal TXS1, though other lane synchronization patterns may be inserted, such as by using a lane synchronization sequence generator (not shown) in the first JESD204 transmit interface. The duration of the transmit alignment portion 723 is controlled by the timing of the pulse 711 in the first transmit strobe signal (TXS1 Strobe) 710, which in turn is determined by the TX1 Data Delay 704. In selected example embodiments, the phase control unit computes the TX1 Data Delay 704 by retrieving the master count value from the previous count capture register 233, adding the radio frame interval 705 (e.g., 10 mS), and subtracting the data path delay (TX1 Path Advance 721). By advancing the transmission of the IQ samples for the first transmit signal path (TX1 IQ Samples) by the data path delay (TX1 Path Advance 721), the IQ samples arrive at the first antenna (Antenna1) in alignment with the predetermined radio frame pulse 703 or 708).

In similar fashion, IQ samples that are to be transmitted over a second transmit signal path TX2 may be aligned with reference to the predetermined radio frame pulse (e.g., 703 or 708) by advancing the IQ samples for the second transmit signal path (TX2 IQ Samples) by an amount (TX2 Path Advance 751) that corresponds to the data path delay for the second transmit signal path TX2. Such a phase adjustment is implemented by computing a transmit data delay value 741 (TX2 Data Delay) for the second transmit signal path TX2 and generating a second transmit strobe signal (TS2 Strobe) 740 having a pulse 742 which is delayed from the previous radio frame pulse 702/707 by the TX2 Data Delay 741. In the example illustrated in FIG. 2, a second transmit phase alignment timer 236 may generate a second transmit strobe signal (TS2 Strobe) 740 having the pulse 742 that is provided over timer control line 243 to a second JESD204 transmit interface 222. In turn, the second JESD204 transmit interface 222 generates a data signal output 750 (JESD204 TX2 DATA) having a first sync data portion 752, a transmit alignment portion 753, and an IQ sample portion 754. To cancel the path delay in the second transmit signal path, the inserted transmit alignment portion 753 is inserted after the sync data portion 752, and transmission is advanced to the previous radio frame pulse 702, as shown with the JESD204 TX2 data signal output 750 (JESD204 TX2 DATA). The duration of the transmit alignment portion 753 is controlled by the timing of the pulse 742 in the second transmit strobe signal (TS2 Strobe) 740, which in turn is determined by the TX2 Data Delay 741 which may be computed by retrieving the master count value from the previous count capture register 233, adding the radio frame interval 705 (e.g., 10 mS), and subtracting the data path delay (TX2 Path Advance 751). By advancing the transmission of the IQ samples for the second transmit signal path (TX2 IQ Samples) by the data path delay (TX2 Path Advance 751), the IQ samples arrive at the second antenna (Antenna2) in alignment with the predetermined radio frame pulse (e.g., 703 or 708) and the IQ samples for the first transmit signal path (TX1 IQ Samples).

Figure 8:
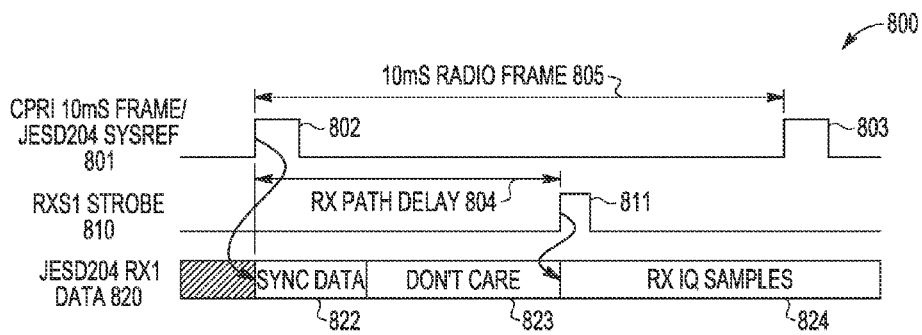
FIG. 8 is a timing diagram illustrating JESD phase alignment of data for a receive signal path.

Selected embodiments of the present disclosure may also be used to align received IQ samples. To provide an example illustration of how different data blocks received on different receive signal paths can be aligned to compensate for individual receive path delays, references is now made to FIG. 8 which depicts a timing diagram 800 illustrating JESD phase alignment of data for a receive signal path RX1. In selected embodiments, timing adjustments are made with reference to a synchronization reference signal 801, such as a radio frame sync signal having pulses 802, 803 periodically generated at predetermined intervals, such as a 10 mS radio frame interval 805. In order to align the retrieval of IQ samples that are received over a first transmit signal path RX1 with reference to a predetermined radio frame pulse (e.g., 802), retrieval of the IQ samples for the first receive signal path (RX1 IQ Samples) is delayed by an amount (RX1 Path Delay 804) that corresponds to the data path delay for the first receive signal path RX1. To this end, a receive path delay value 804 (RX1 Data Delay) for the first transmit signal path TX1 is computed and used to generate a first receive strobe signal (RXS1 Strobe) 810 having a pulse 811 which is delayed from the radio frame pulse 802 by the RX Path Delay 804. In the example illustrated in FIG. 2, a first receive phase alignment timer 238 may generate a timer control signal 241 to convey the first receive strobe signal (RXS1 Strobe) 810 having the pulse 811 that is provided to a first JESD204 receive interface 225. In turn, the first JESD204 receive interface 225, which receives a data signal 820 (JESD204 RX1 DATA) having a first sync data portion 822, is configured to delay the selection or retrieval of the IQ sample portion 824 until the pulse 811 in the first receive strobe signal (RXS1 Strobe) 810 is received. As a result, the received data signal 820 (JESD204 RX1 DATA) includes a sync data portion 822, a second portion 823 of "don't care" data that may be disregarded, and an IQ sample portion 824 of IQ samples for the first receive signal path (RX1 IQ Samples). As shown in FIG. 4, the delayed retrieval of IQ samples for the first receive signal path (RX1 IQ Samples) may be implemented by inserting a connection switch 415 after the de-framer 414 that is controlled by a receive strobe signal (RXS1 pulse).

Figure 9:
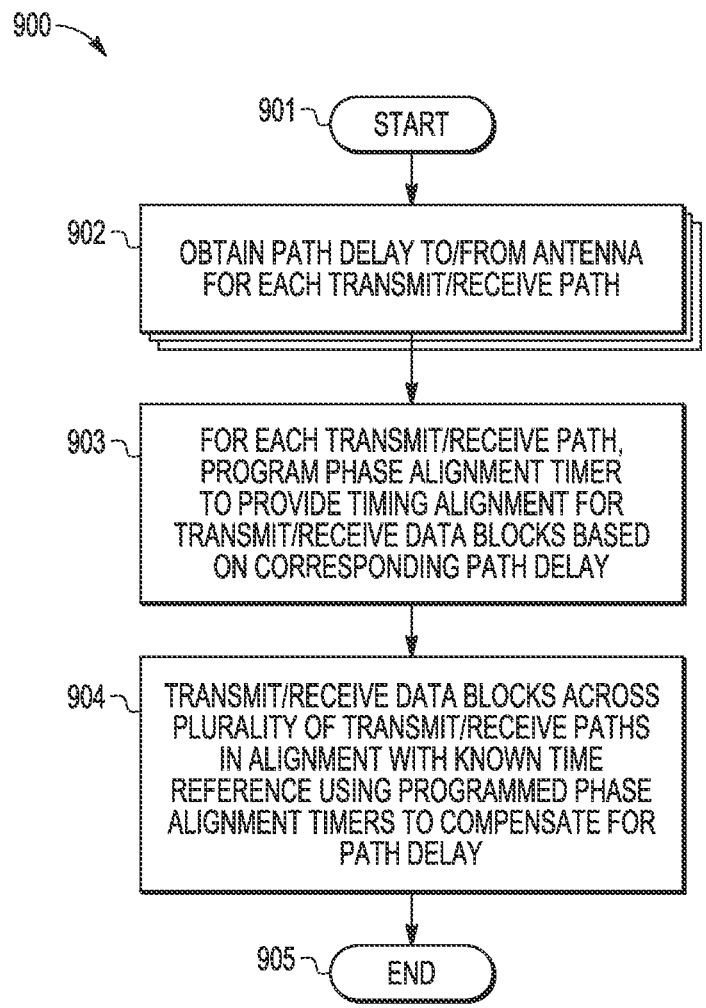
FIG. 9 depicts an example flow diagram according to a method for aligning data blocks in accordance with selected embodiments of the present invention.

Referring now to FIG. 9, there is depicted an example flow diagram 900 of a method for aligning data blocks in accordance with selected embodiments of the present invention. Once the method starts at step 901, path delay values for each transmit and/or receive signal path are retrieved, computed, measured, or otherwise obtained. In selected embodiments, the path values for each signal path may be calibrated at the factory and stored in non-volatile memory for retrieval by a phase control unit. In one embodiment, the values are obtained by calculating values during factory calibration. In other embodiments, the values are obtained by periodically calibrating path delay values in the field. Alternatively, field calibrations may be performed in real time or periodically to obtain and/or store path delay values. However obtained, the path delay values are used to align data block transmission and/or retrieval as described herein.

At step 903, the phase alignment timers for each transmit or receive signal path are programmed to provide alignment for the data blocks to be sent or received over the signal paths based on the corresponding path delay values. For example, transmit phase alignment timers may be programmed to transmit IQ samples from the JESD204B interface ahead of the RF sync pulse at the antenna for that signal path. In addition or in the alternative, receive phase alignment timers may be programmed to delay retrieval of IQ samples from the JESD204B interface until after a pre-determined delay period relative to 10 ms RF sync pulse.

Once the alignment timers for all transmit and/or receive signal paths have been programmed, the programmed phase alignment timers are used to transmit or receive the data blocks over the signal paths in alignment with a known time reference at step 903. In this way, phase compensation is implemented across multiple communication links with respect to a given reference point, such as a radio frame boundary.

As will be appreciated, the timing alignment control circuits and methods described herein provide a way to compensate for line delay that may arise in the signal paths to and from the antennas. In addition, the timing alignment control circuitry may be embodied in hardware (e.g., as a controller), in processing circuitry (e.g., a processor or controller) executing software (e.g., including but is not limited to firmware, resident software, microcode, etc.), or in some combination of hardware and software elements. Furthermore, the timing alignment control circuitry may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD.

By now it should be appreciated that there has been provided a circuit, method and system for operating a base station having a plurality of radio frequency (RF) communication signal paths over a plurality of transceiver front ends to a plurality of antennas at the base station. In the disclosed system and methodology, a plurality of path delays are obtained (e.g., measured, calibrated, computed, or retrieved as factory-calibrated path delay values from memory) for the plurality of RF signal paths. Using the corresponding path delay values for the RF signal paths, one or more IQ data blocks are transmitted over each RF signal path ahead of a first predetermined time slot (e.g., a CPRI synchronization pulse) by an advance time period equaling or compensating for the path delay for the RF signal path, thereby aligning IQ data block signaling to the first predetermined time slot at the first antenna. In selected embodiments, the IQ data blocks are transmitted by computing a data delay period from a second predetermined time slot preceding the first predetermined time slot, and then transmitting the IQ data block(s) over an RF signal path upon expiration of the data delay period after the second predetermined time slot and ahead of a first predetermined time slot by the advance time period equaling the path delay for said RF signal path. In other embodiments, the IQ data blocks are transmitted by, generating a first phase alignment pulse signal for each RF signal path in advance of the first predetermined time slot by an advance time period, and then providing the first phase alignment pulse signal to a serial interface (e.g., a JESD204-compliant digital interface) to trigger transmission of the one or more IQ data blocks over the RF signal path in advance of the first predetermined time slot by the advance time period. For example, the first phase alignment pulse signal may be used to gate a switch in a framer module of the serial interface to transmit a lane synchronization sequence (e.g., zero fill data formed as a sequence of 0s) over the RF signal path during a first phase of the first phase alignment pulse signal, and to transmit the one or more IQ data blocks over the RF signal path during a second phase of the first phase alignment pulse signal. The first phase alignment pulse signal may be generated by a transmit phase alignment timer which is programmed by a phase control unit. To assist with transmission of software-generated IQ data blocks over an RF signal path, the IQ data blocks may be stored in a transmit buffer at the serial interface for an RF signal path ahead of IQ data block transmission by an advance buffer load time period, such as by performing a direct memory access operation from an AxC container to the transmit buffer.

In other embodiments, there is disclosed a circuit, method, and system for receiving data blocks at a base station having a plurality of communication signal paths (e.g. RF signal paths) over a plurality of transceiver front ends to a plurality of antennas at the base station. In the disclosed system and methodology, path delay's values are determined (e.g., measured, computed, or retrieved from memory) for the communication signal paths. One or more IQ data blocks are retrieved from each digital signal received over a corresponding signal path after a predetermined delay period equaling or compensating for the receive path delay for the signal path, thereby aligning IQ data block retrieval to the synchronization point of the received digital signal. In selected embodiments, the IQ data blocks are retrieved by generating a receive phase alignment pulse signal for a first RF signal path which is delayed from the synchronization point by the predetermined delay period, where the receive phase alignment pulse signal is provided to a serial interface (e.g., JESD204/JESD204A/JESD204B digital interface) to trigger buffering of the one or more IQ data blocks received over the signal path after the predetermined time slot by the predetermined delay period. For example, the receive phase alignment pulse signal may be used to gate a switch to connect a framer module and FIFO buffer of the serial interface to buffer the one or more IQ data blocks in response to the receive phase alignment pulse signal. The receive phase alignment pulse signal may be generated by a receive phase alignment timer which is programmed by, the phase control unit.

In yet other embodiments, there is disclosed an integrated circuit and associated method of operation for use with a wireless communication device having a plurality of radio frequency (RF) signal paths connected between the integrated circuit and a plurality of antennas, where each RF signal path having an associated path delay. In selected embodiments, the integrated circuit implements a digital front end for the wireless communication device (e.g., a base station), and includes serial data interfaces (e.g., JESD204, JESD204A, or JESD204B digital interfaces) for transmitting or receiving data blocks over a corresponding plurality of signal paths to and from the plurality of antennas in response to a corresponding plurality of alignment signals. The integrated circuit may include a plurality of timers coupled to provide phase alignment signals to the serial data interfaces, including timers for controlling the serial data interfaces connected to antennas over a the RF signal paths so that data block transmission over the plurality of RF signal paths is phase aligned to the first predetermined synchronization pulse. To this end, the plurality of timers may each be configured to generate a phase alignment signal for the corresponding serial data interface in advance of a first predetermined synchronization pulse by an advance time period equaling or compensating for the path delay for the RF signal path for aligning data block signaling to the first predetermined synchronization pulse at the first antenna. The In selected embodiments, the integrated circuit also includes a transmit FIFO buffer and framer at each serial data interface where the framer is coupled to process data blocks from the FIFO buffer in response to a corresponding phase alignment signal. The integrated circuit may also include one or inure controllers (e.g., DMA controllers) for storing one or more IQ data blocks in each transmit FIFO buffer in response to a corresponding second alignment signal generated by a transmit buffer timer ahead of the phase alignment signal by an advance buffer load time period.

In still yet other embodiments, there is disclosed an integrated circuit and associated method of operation for use with a wireless communication device having a plurality of radio frequency (RF) signal paths connected between a plurality of antennas and the integrated circuit, where each RF signal path has an associated path delay. The disclosed integrated circuit includes a plurality of receive serial data interfaces for receiving data blocks over a corresponding plurality of RF signal paths from the plurality of antennas. The integrated circuit also includes a plurality of timers coupled to provide a corresponding plurality of receive alignment signals for controlling the plurality of receive serial data interfaces, where each timer is configured to generate an alignment signal for the corresponding receive serial data interface after a predetermined delay period compensating for the receive path delay for said RF signal path.

Although the described exemplary embodiments disclosed herein are directed to methods and systems for aligning the transmission and/or retrieval of IQ samples in a multi-antenna base station controller, the present invention is not necessarily limited to the example embodiments illustrate herein, and various embodiments of the timing alignment control circuitry and methods disclosed herein may be implemented with other devices and circuit components. For example, the disclosed method and system for phase compensation may be used with multi-antenna wireless devices. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

What is claimed is:

1. A method for operating a base station comprising a plurality of communication signal paths over a plurality of transceiver front ends to a plurality of antennas at the base station, comprising:
    obtaining a plurality of path delay values for the plurality of communication signal paths; and
    for each of the plurality of communication signal paths, transmitting one or more data blocks onto said communication signal path ahead of a first predetermined time slot by an advance time period compensating for the path delay value for said communication signal path by:
        computing a data delay period from a second predetermined time slot preceding the first predetermined time slot; and
        transmitting the one or more data blocks over the first communication signal path upon expiration of the data delay period after the second predetermined time slot and ahead of a first predetermined time slot by the advance time period equaling the path delay for the first communication signal path,
    thereby aligning data block signaling over said communication signal path to the first predetermined time slot.

2. The method of claim 1, where obtaining the plurality of path delay values comprises:
    measuring a path delay value for each of the plurality of communication signal paths in the field, or
    retrieving a factory-calibrated path delay value for each of the plurality of communication signal paths.

3. The method of claim 1, further comprising:
    generating the one or more data blocks; and
    storing the one or more data blocks in a transmit buffer for the first communication signal path ahead of transmitting the one or more data blocks over the first communication signal path by an advance buffer load time period.

4. The method of claim 3, where storing the one or more data blocks comprises performing a direct memory access store operation from an antenna-carrier (AxC) container to the transmit buffer.

5. The method of claim 1, where transmitting one or more data blocks comprises transmitting the one or more data blocks over a JESD204-compliant digital interface in advance of the first predetermined time slot by the advance time period.

6. A method for operating a base station comprising a plurality of communication signal paths over a plurality of transceiver front ends and corresponding plurality of antennas at the base station, comprising:
    receiving a plurality of digital signals over a corresponding plurality of communication signal paths, each having a receive path delay, where each digital signal comprises a synchronization point; and
    retrieving one or more data blocks from each digital signal received over a corresponding communication signal path after a predetermined delay period compensating for the receive path delay for said communication signal path, thereby aligning data block retrieval to the synchronization point of the received digital signal,
    where retrieving one or more data blocks comprises:
        generating a first phase alignment pulse signal for a first communication signal path which is delayed from the synchronization point by the predetermined delay period; and
        providing the first phase alignment pulse signal to a serial interface to trigger buffering of the one or more data blocks received over the first communication signal path after the synchronization point by the predetermined delay period.

7. The method of claim 6, further comprising obtaining a plurality of receive path delay values corresponding to the plurality of communication signal paths by measuring or retrieving from memory receive path delay values for the plurality of communication signal paths.

8. The method of claim 6, where providing the first phase alignment pulse signal to the serial interface comprises gating a switch to connect a framer module and FIFO buffer of the serial interface to buffer the one or more data blocks in response to the first phase alignment pulse signal.

9. The method of claim 6, where a phase control unit programs a receive phase alignment timer to generate the first phase alignment pulse signal.

10. An integrated circuit for a wireless communication device comprising a plurality of radio frequency (RF) signal paths connected between the integrated circuit and a plurality of antennas, each RF signal path having an associated path delay, the integrated circuit comprising:
    a plurality of serial data interfaces for transmitting data blocks over a corresponding plurality of RF signal paths to the plurality of antennas; and
    a plurality of timers coupled to provide a corresponding plurality of phase alignment signals for controlling the plurality of serial data interfaces, where each timer is configured to generate a phase alignment signal for the corresponding serial data interface in advance of a first predetermined synchronization pulse by an advance time period compensating for a path delay for the RF signal path, where each of the plurality of serial data interfaces comprises a FIFO buffer and a framer coupled to process data blocks from the FIFO buffer in response to a corresponding phase alignment signal.

11. The integrated circuit of claim 10, where the plurality of timers are configured to provide the corresponding plurality of phase alignment signals so that data block transmission over the plurality of RF signal paths is phase aligned to the first predetermined synchronization pulse.

12. The integrated circuit of claim 10, where the wireless communication device comprises a base station and where the plurality of serial data interfaces are compliant with a JESD204 standard.

13. The integrated circuit of claim 10, further comprising:
a transmit buffer at each of the plurality of serial data interfaces; and
    one or more controllers for storing IQ data blocks in each transmit buffer in response to a plurality of second alignment signals, where each second alignment signal for an RF signal path is generated by a transmit buffer timer ahead of the phase alignment signal for the RF signal path by an advance buffer load time period.

14. An integrated circuit for a wireless communication device comprising a plurality of radio frequency (RF) signal paths connected between a plurality of antennas and the integrated circuit, each RF signal path having an associated path delay, the integrated circuit comprising:
    a plurality of receive serial data interfaces for receiving data blocks over a corresponding plurality of RF signal paths from the plurality of antennas, each receive serial data interface comprising a connection switch for connecting a FIFO buffer to receive IQ samples from a deserializer and deframer connected in series to a corresponding antenna; and a plurality of timers coupled to provide a corresponding plurality of receive alignment signals, each gating a corresponding connection switch in one of the plurality of receive serial data interfaces, where each timer is configured to generate an alignment signal for the corresponding receive serial data interface after a predetermined delay period compensating for the receive path delay for said RF signal path, where one or more data blocks are retrieved from a digital signal received over a first RF signal path by:
generating at a first timer a first phase alignment pulse signal for the first RF signal path which is delayed from a synchronization point in the digital signal by the predetermined delay period; and
providing the first phase alignment pulse signal to a corresponding receive serial data interface to trigger buffering of the one or more data blocks received over the first RF signal path after the synchronization point by the predetermined delay period.

15. A method for operating a base station comprising a plurality of communication signal paths over a plurality of transceiver front ends to a plurality of antennas at the base station, comprising:
obtaining a plurality of path delay values for the plurality of communication signal paths; and
for each of the plurality of communication signal paths, transmitting one or more data blocks onto said communication signal path ahead of a first predetermined time slot by an advance time period compensating for the path delay value for said communication signal path by:
generating a first phase alignment pulse signal for a first communication signal path in advance of the first predetermined time slot by a first advance time period; and
providing the first phase alignment pulse signal to a serial interface for the first communication signal path to trigger transmission of the one or more data blocks over the first communication signal path in advance of the first predetermined time slot by the first advance time period by gating a switch in a framer module of the serial interface to transmit a lane synchronization sequence over the first communication signal path during a first phase of the first phase alignment pulse signal, and to transmit the one or more data blocks over the first communication signal path during a second phase of the first phase alignment pulse signal, thereby aligning data block signaling over said communication signal path to the first predetermined time slot.

16. The method of claim 15, where the lane synchronization sequence comprises zero fill data.

17. The method of claim 15, where the first predetermined time slot comprises a CPRI synchronization pulse.

18. The method of claim 15, further comprising programming, in a phase control unit, a transmit phase alignment timer to generate the first phase alignment pulse signal.

* * * * *